US007792511B2

(12) United States Patent
Weston et al.

(10) Patent No.: US 7,792,511 B2
(45) Date of Patent: Sep. 7, 2010

(54) SECURITY SYSTEM WITH DYNAMIC RANGE ENHANCEMENT FOR FM DEMODULATION

(75) Inventors: Lance Weston, East Northport, NY (US); Tony T Li, Roslyn Heights, NY (US); Mark H Schmidt, West Islip, NY (US)

(73) Assignee: Honeywell International Inc., Morristown, NJ (US)

( * ) Notice: Subject to any disclaimer, the term of this patent is extended or adjusted under 35 U.S.C. 154(b) by 576 days.

(21) Appl. No.: 11/831,395

(22) Filed: Jul. 31, 2007

(65) Prior Publication Data
US 2009/0036076 A1 Feb. 5, 2009

(51) Int. Cl.
*H04B 7/00* (2006.01)
*H04K 3/00* (2006.01)
(52) U.S. Cl. ........................ 455/260; 455/265
(58) Field of Classification Search ............. 455/75–76, 455/255–265; 327/156–157; 331/11, 17, 331/25; 375/373–376
See application file for complete search history.

(56) References Cited
U.S. PATENT DOCUMENTS
6,542,041 B2 * 4/2003 Choi ........................... 331/17

2003/0224736 A1 * 12/2003 Lin .............................. 455/76
2004/0051592 A1 * 3/2004 Ho et al. ....................... 331/17
2005/0032503 A1 * 2/2005 Goto et al. ................ 455/404.1
2005/0242890 A1 * 11/2005 Wu et al. ....................... 331/18

OTHER PUBLICATIONS

MM74HC4046 CMOS Phase Lock Loop Data Sheets, Fairchild Semiconductors, Feb. 1984 revised Oct. 2003.

* cited by examiner

*Primary Examiner*—Lee Nguyen
(74) *Attorney, Agent, or Firm*—Husch Blackwell Sanders Welsh & Katz

(57) ABSTRACT

A system and method for communicating between a base and a remote device in a security system. The base receives an audio signal from a telephone network via a panel and then frequency modulates the audio signal at a carrier frequency to generate an FM signal. The remote device receives the FM signal from the base, determines a phase error signal representing the phase error between the received FM signal and an output signal of a voltage controlled oscillator, determines a difference between the carrier frequency and a center frequency of the voltage controlled oscillator, and, if there is a difference, then changes the center frequency of the voltage controlled oscillator to match the carrier frequency of the FM signal.

4 Claims, 6 Drawing Sheets

SECURITY SYSTEM WITH DYNAMIC RANGE ENHANCEMENT FOR FM DEMODULATION

TECHNICAL FIELD

This invention relates to FM communication between components of a security system, and in particular to increasing the dynamic range of the FM signal demodulation circuit.

BACKGROUND ART

In today's security systems it is desirable for the central control station to be able to communicate with a security system user during an alarm situation. The operator at the central control station can ask the user for the security code and the type of assistance the user requires. The user can respond with the required information. In order to accomplish this in a wireless security system, the operator's voice, which enters the security system through the phone line connected to the panel, must be transmitted to the remote devices of the security system such as the keypad, the pendant, etc. The security system panel accomplishes this by enabling a base station connected to the panel to seize the phone line. The base station converts the audio signal from the phone line into an FM signal and transmits the FM signal to the remote security system devices as well known in the art. The remote security system devices demodulate the FM signal and send the recovered audio signal through a speaker to the user. When the user communicates with the operator, the opposite operation takes place with the remote devices modulating the audio signal and the base station demodulating the FM signal to an audio signal. The audio signal is then sent to the operator through the phone line.

The modulation of the audio signals and demodulation of the FM signals, techniques well known in the art, introduce noise and in some situations drop outs into the audio signal. This occurs because the circuits that perform the modulation and demodulation use discrete components that are manufactured within certain tolerances. The tighter the tolerances are, the more expensive the components are. In order to be cost effective, the devices are typically manufactured with less expensive components. In addition, operating characteristics of these components may change with age and with temperature variations. These component variations may cause a 90 KHz FM carrier (or base) frequency to become lower than 80 KHz or higher than 100 KHz. When the audio signal, which has a 20 KHz bandwidth is imposed on the carrier frequency the resulting FM signal could be in the range of 50 KHz to 70 KHz, in the range of 110 KHz to 130 KHz, or somewhere in between. When the demodulation circuit tries to decode the audio signal from the FM signal that has a carrier frequency that has drifted significantly, the resulting audio signal becomes distorted. One way to overcome this problem is to increase the dynamic range of the demodulation circuit by increasing its bandwidth and decreasing its sensitivity to cover the entire 50 KHz to 130 KHz range, but this allows more noise into the decoded signal. Another solution is to trim, or adjust, each security device during installation to make sure that the audio signal is not distorted. This solution is costly to the installers of the security device. It is desirable to install multiple devices that are low cost and that communicate clearly right off the shelf.

It is therefore an object of the present invention to provide an alarm device that can demodulate a wide dynamic range of FM signals.

It is a further object of the present invention to provide an alarm device that generates an accurate audio signal.

It is a further object of the present invention to provide an alarm device that self-adjusts for accurate FM communication.

Finally it is a further object of the present invention to provide an alarm system that is inexpensive to manufacture and install.

DISCLOSURE OF THE INVENTION

The present invention is a method of communicating between a base and a remote device in a security system. The base receives an audio signal from a telephone network via a panel, and frequency modulates the audio signal at a carrier frequency to generate an FM signal. The remote device receives the FM signal from the base, determines a phase error signal representing the phase error between the received FM signal and an output signal of a voltage controlled oscillator, determines a difference between the carrier frequency and a center frequency of the voltage controlled oscillator, and, if there is a difference, then changes the center frequency of the voltage controlled oscillator to match the carrier frequency of the FM signal.

The step of changing, at the remote device, the center frequency of the voltage controlled oscillator to match the carrier frequency of the FM signal, includes applying the phase error signal to a low pass filter, and if the output of the low pass filter is greater than a predetermined nominal voltage, then charging a capacitor; but if the output of the low pass filter is less than a predetermined nominal voltage, then discharging a capacitor. The center frequency select signal is adjusted based on the charging or discharging state of the capacitor; and the center frequency of the voltage controlled oscillator is changed to match the carrier frequency of the FM signal based on the center frequency select signal.

The security system of this invention has a panel adapted to communicate over a telephone network; a base interconnected to the panel to send and receive audio signals from the telephone network via the panel, the base having an FM modulator for frequency modulating an audio signal at a carrier frequency to generate an FM signal; and a remote device in wireless communication with the base. The remote device has a receiver for receiving the FM signal from the base; a voltage controlled oscillator; a phase lock loop circuit for determining a phase error signal representing the phase error between the received FM signal and an output signal of the voltage controlled oscillator; and a center frequency adjusting circuit. The center frequency adjusting circuit determines a difference between the carrier frequency and a center frequency of the voltage controlled oscillator, and, if there is a difference, it then changes the center frequency of the voltage controlled oscillator to match the carrier frequency of the FM signal. The center frequency adjusting circuit includes a low pass filter to which the phase error signal is applied, the low pass filter including a capacitor that is charged if the output of the low pass filter is greater than a predetermined nominal voltage or discharged if the output of the low pass filter is less than a predetermined nominal voltage.

The invention may also be bidirectional, wherein the modulation is carried out by the remote device (such as when a remote user speaks into a microphone at the remote device), and the demodulation is carried out at the base (so the demodulated audio signal may be transmitted to the central station).

BEST MODE FOR CARRYING OUT THE INVENTION

Figure 1:
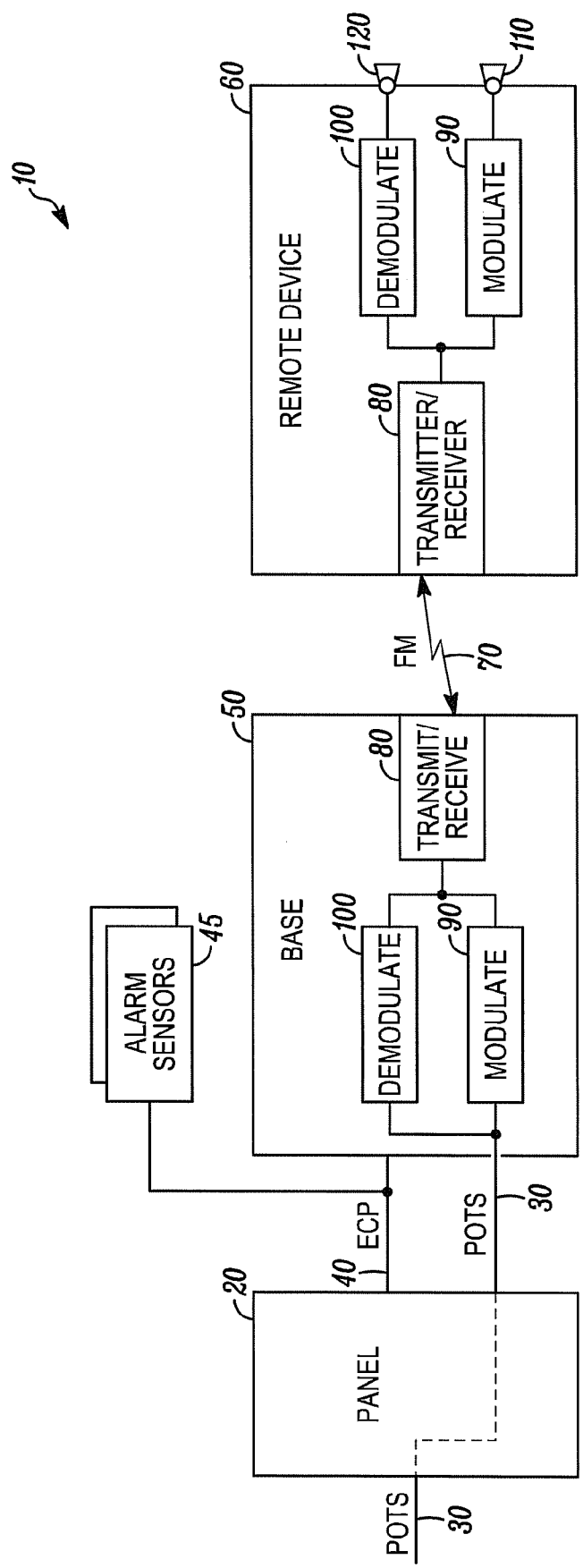
FIG. 1 is a diagram of a security system of the present invention.

The preferred embodiments of the present invention will now be described with respect to the Figures. FIG. 1 shows a block diagram of an alarm system 10, which includes a panel 20 that communicates to a base 50 over a standard alarm system ECP bus 40. A plurality of alarm sensors 45 (such as PIR motion detectors, glassbreak detectors, door or window closure detectors, etc.) are connected via the ECP bus 40 (or wirelessly) to the panel as known in the art. The panel is connected to a telephone line 30 (POTS—plain old telephone system), which is also connected to the base 50 through the panel 20. The panel 20 communicates with the central control station (not shown) over the telephone line 30. When an operator at the central control station wants to speak to a user, typically during an alarm situation, the central control station signals to the panel 20 to wake up the base 50. The base 50 modulates the audio signal from the operator using modulator 90 and transmits the resulting FM signal 70 using transmitter/receiver 80. A remote device 60, which may be a console, keypad, key fob, pendent, or other device, receives the FM signal 70 using a similar transmitter/receiver 80. The remote device 60 demodulates the received signal using the demodulator circuit 100 and transmits the resulting audio signal to the user through speaker 120. When the user communicates back to the operator at the central control station, the audio signal from the user is collected by the microphone 110 and is modulated by the modulator circuit 90 (similar to the modulator circuit 90 in the base). The resultant FM signal 70 is transmitted by transmitter/receiver 80 in the remote device 60 and received by the transmitter/receiver 80 in the base 50. The received signal is now demodulated by the base demodulation circuit 100 (similar to remote device 60 demodulator 100) and the resultant audio signal is transmitted to the operator through the telephone line 30. FIG. 1 shows only one remote device, but there may be multiple devices in communication with the base 50.

Figure 2:
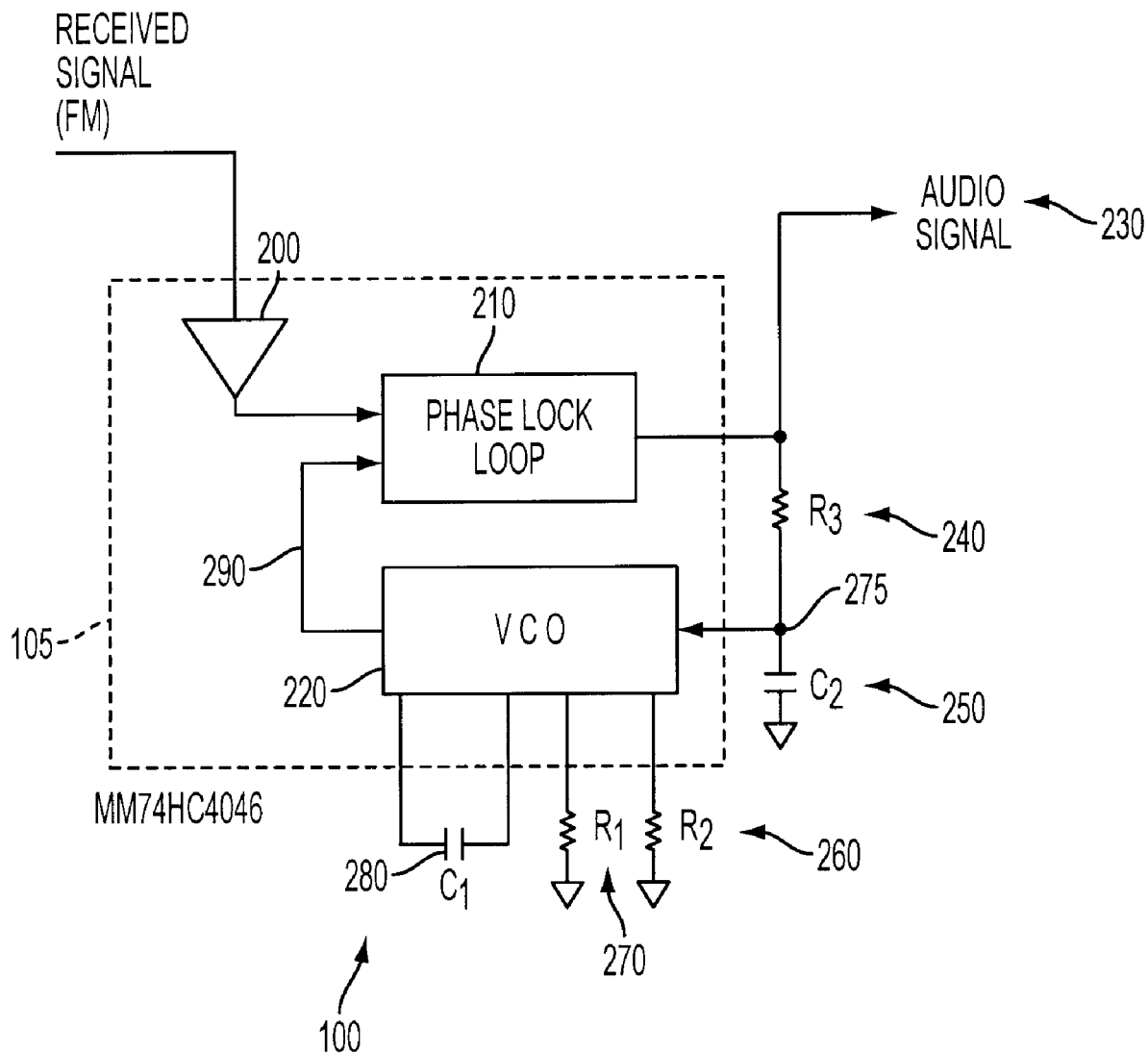
FIG. 2 is a diagram of a prior art demodulation circuit.

When the audio signal is modulated and demodulated, errors are introduced that cause the signal to be clipped or garbled. These errors occur because of the tolerances of the components of the modulation and demodulation circuits. In order to show how these errors occur a typical prior art demodulation circuit 100 is shown in FIG. 2. The primary component of this demodulation circuit is a CMOS Phase Lock Loop device 105, which for example may be the MM74HC4046 device available from FAIRCHILD SEMICONDUCTORS, which is shown in dotted lines in FIG. 2. The received signal from the transmitter/receiver 80 is filtered by amplifier 200. This FM signal is compared to a signal generated from a voltage-controlled oscillator (VCO) 220. The frequency of the signal 290 from the VCO 220 should be equal to the carrier frequency of the received FM signal. The phase lock loop circuit 210 determines the difference between the two signals and generates a phase error. If the carrier frequency of the FM signal is matched to the center frequency of the VCO signal 290 than the phase error comes from the audio signal imposed on the center frequency of the FM signal. In this perfect situation the phase error is the audio signal 230. Also in this perfect situation the phase error is adjusted by R3 240 and C2 250 to produce a signal 275 that is nominally 2.5V and swings around the 2.5V, from 0 to 5V, in accordance with the audio signal 230. The center frequency of the VCO signal 290 and the swing around the 2.5V, which is related to the bandwidth (or sensitivity) of the demodulation circuit 100, is determined by the values of C1 280, R1 270, and R2 260.

In practice, however, the tolerances of the components cause the carrier frequency to be different from the center frequency of the VCO signal 290. This causes the signal 275 into the VCO to nominally be at 3.5V (for instance) and swing from 1V to 5V. This decreases the dynamic range of the demodulator and clips all the audio signals that should produce a 6V VCO input signal 275. As stated in the background there are ways to compensate for this problem. One is to use expensive components so that the carrier frequency of the modulation circuit 90 is the same as the center frequency of the demodulation circuit 100. This increases the cost of manufacturing the security system devices. A second way to compensate for this problem is to change the sensitivity of the demodulation circuit 100 so that the voltage swing (0V to 5V) on the signal 275 into the VCO controls the VCO to produce a much wider frequency range on the VCO output signal 290. This decreases the sensitivity of the demodulation circuit 100 and introduces noise errors into the audio signal 230. Another way to compensate for this problem is to trim the components in the modulator or demodulator (or both), so that the carrier frequency and the center frequency match. The problem with this method is that the installers need to add another task to their installation routine. This task needs to be performed on each remote device, which requires additional extra time, which translates to additional expense. Also, the task may not be performed properly causing the security system to be compromised, or the components may change characteristics over time due to age or temperature that may cause a change in the carrier frequency or the center frequency regardless of trim accuracy.

Figure 3:
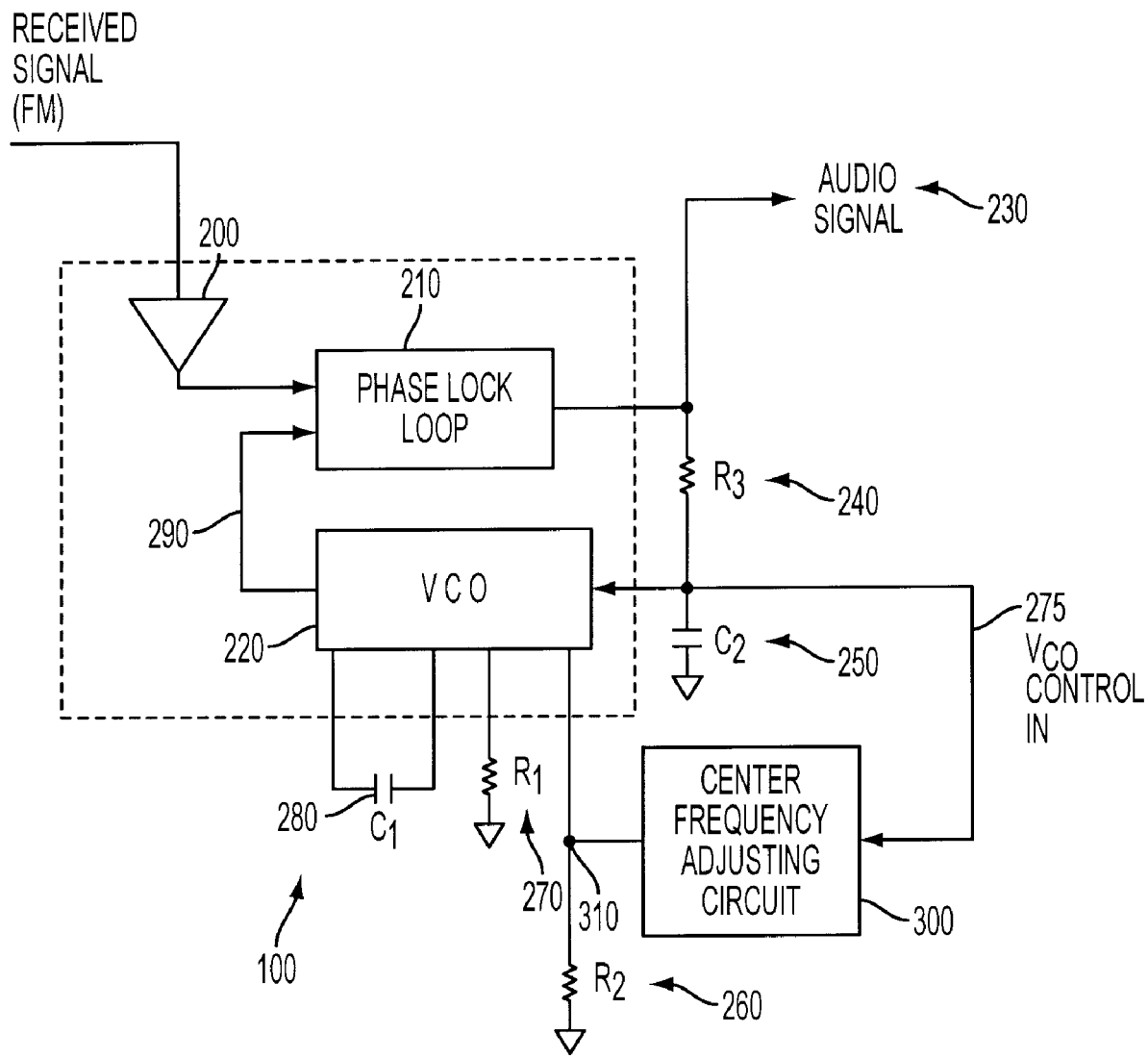
FIG. 3 is a diagram of the present invention demodulation circuit.

The present invention addresses the problem of having a difference between the carrier frequency of the transmitted FM signal and the center frequency of the VCO 220 without the need to trim components, without the need to use expensive components, and without the loss of sensitivity. Shown in FIG. 3 is the demodulation circuit 100 of the present invention. The demodulation circuit 100 of the present invention has all the components of the prior art demodulation circuit 100 shown in FIG. 2 with the addition of a center frequency adjusting circuit 300. This circuit senses the difference between the carrier frequency and the center frequency and automatically adjusts the center frequency of the demodulation circuit 100 to match the carrier frequency of the FM signal 70. This automatic adjustment takes care of errors from components in both the modulator 90 and the demodulator 100. The center frequency adjusting circuit 300 inputs the VCO control input signal 275 and determines if the nominal voltage is 2.5V (as described below). If it is, then the current through R2 260 is unchanged, causing the center frequency select voltage to stay at 3.75V and the center frequency of the VCO 220 to stay at 90 KHz. If the nominal voltage is above or below 2.5V then the center frequency adjusting circuit 300 increases or decreases the current through R2 260 to cause the VCO to have a higher or lower center frequency as needed.

Figure 4:
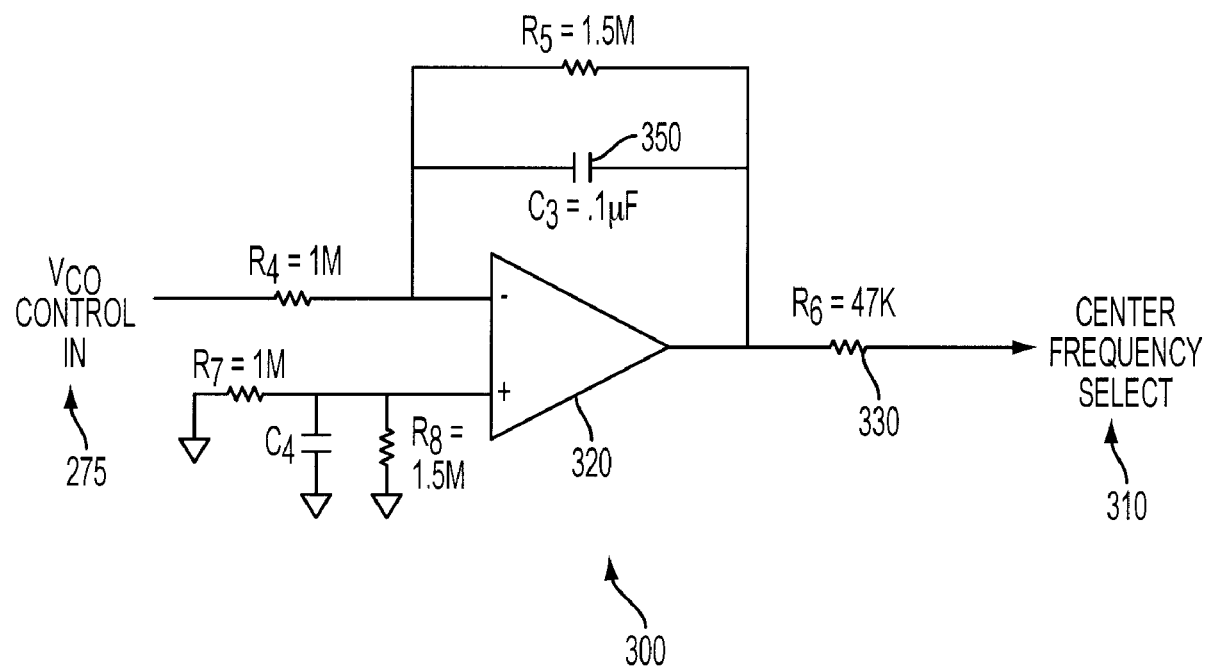
FIG. 4 is a circuit diagram of the center frequency adjusting circuit.

FIG. 4 shows the center frequency adjusting circuit 300. The circuit is a 20 Hz low pass filter circuit. The circuit reflects any the frequency components of the VCO control signal 275 that are above 300 Hz, i.e. the audio signal that is in the 20 Khz range. The difference between the carrier frequency and the center frequency of the VCO 220 will be a DC or very slow changing signal and will therefore charge or discharge C3 350. C3 350 will be charged or discharged depending on whether the VCO control signal 275 is greater or less than 2.5V. Charging it will increase the current through R6 330 and increase the voltage to the center frequency select input 310. Discharging is will decrease the current through R6 330 causing the voltage to the center frequency select input 310 to decrease.

Figure 5:
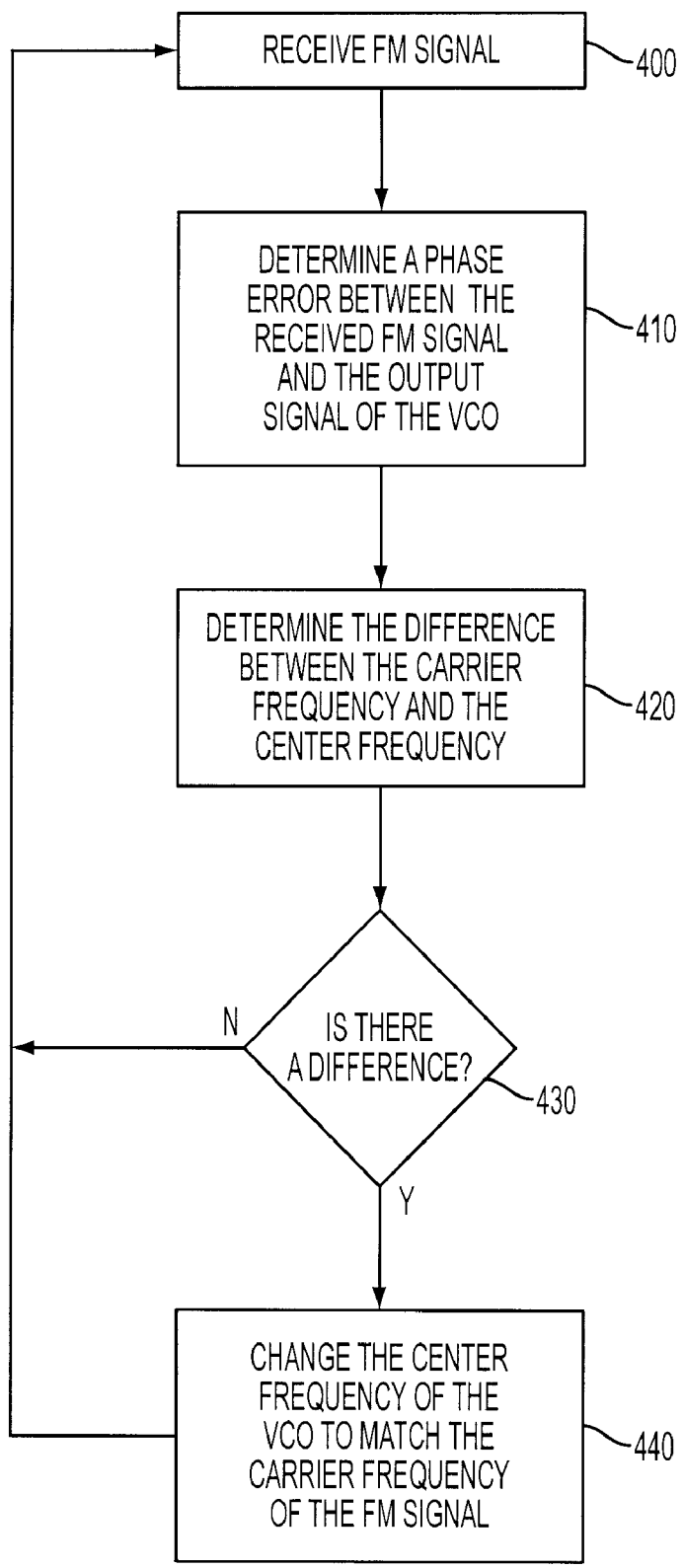
FIG. 5 is a flow chart of operation of the present invention.

FIG. 5 shows a flow diagram for the operation of the present invention. An FM signal is received in step 400 by a demodulation circuit 100. In step 410 a phase error is determined from the difference between the received FM signal in step 400 and an output signal from a VCO 220. The phase error includes the audio signal and the difference between the carrier frequency of the FM signal and the center frequency of the VCO 220. In step 420 the difference between the carrier frequency of the FM signal and the center frequency of the VCO 220 is determined using center frequency adjusting circuit 300. In step 430 if there is a difference, the center frequency of the VCO is changed to match the carrier frequency of the FM signal in step 440. This is done by changing the current through resister R2 260 an amount proportionate to the difference between the carrier frequency and the center frequency. After the center frequency change, or if there has been no change, the FM signal continues to be received in step 400. Any subsequent changes in the carrier frequency will be detected by the center frequency adjusting circuit 300.

Figure 6:
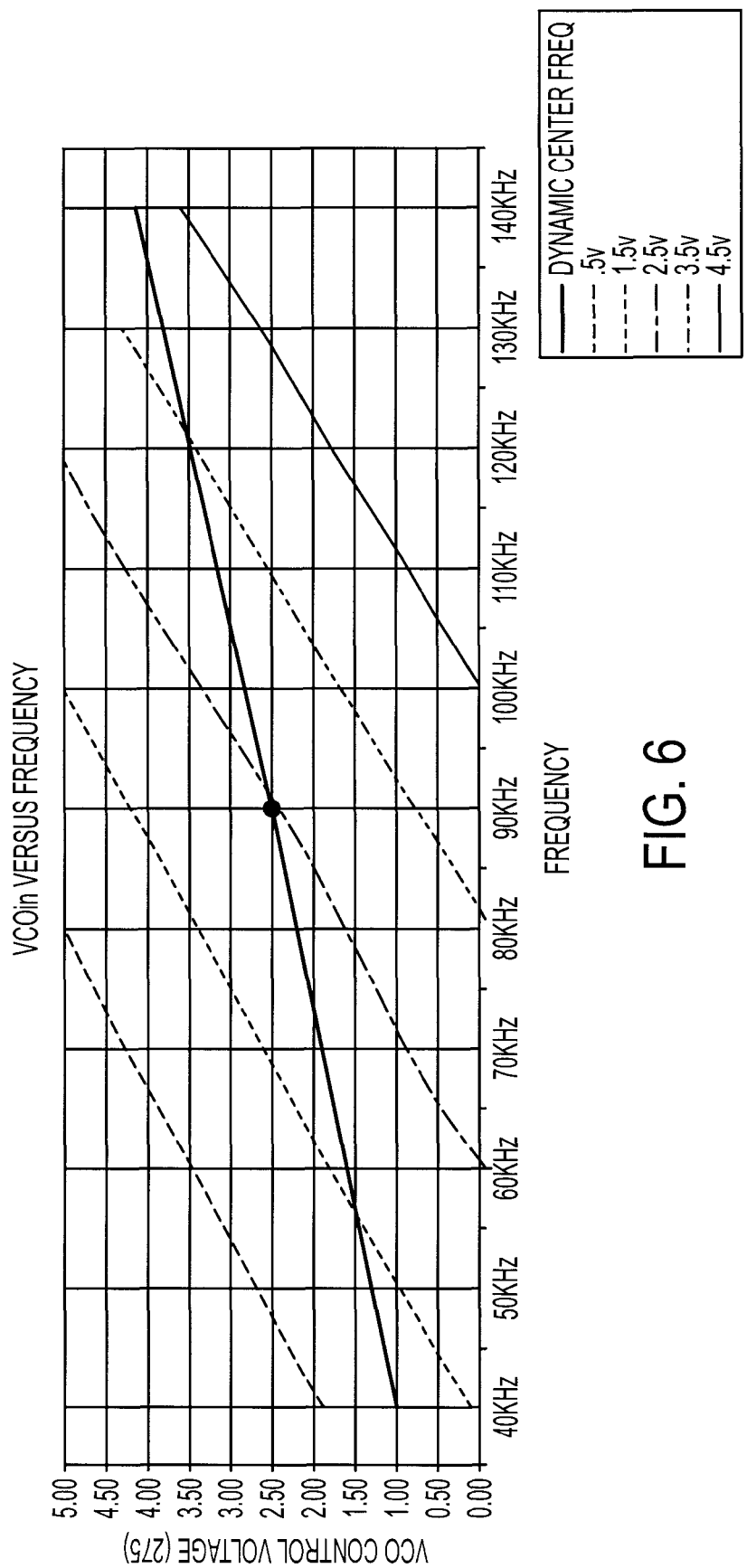
FIG. 6 is a chart showing the difference in the dynamic range of the demodulation circuit with and without the carrier frequency adjusting circuit.

FIG. 6 shows a graph of the VCO control input signal 275 vs. the carrier/center frequency. The dotted lines show the VCO control signal 275 without the center frequency adjusting circuit 300. Each of the dotted lines represents a different carrier/center frequency depending on the components of the transmitting device. The solid line shows the VCO control input signal 275 with the frequency adjusting circuit 300. As can be seen the whole frequency band is within the 0V-5V range of the VCO control input signal 275.

It will be apparent to those skilled in the art that modifications to the specific embodiment described herein may be made while still being within the spirit and scope of the present invention. For example, the values of the resistors and capacitors may be different. The frequency range may be different and the operation of the security system panel 20 and base 50 may be different.

What is claimed is:

1. A method of communicating between a base and a remote device in a security system, said method comprising:
    a) the base receiving an audio signal from a telephone network via a panel;
    b) the base frequency modulating the audio signal at a carrier frequency to generate an FM signal;
    c) the remote device receiving the FM signal from the base;
    d) at the remote device, determining a phase error signal representing the phase error between the received FM signal and an output signal of a voltage controlled oscillator;
    e) at the remote device, determining a difference between the carrier frequency and a center frequency of the voltage controlled oscillator; and
    f) if there is a difference, then changing, at the remote device, the center frequency of the voltage controlled oscillator to match the carrier frequency of the FM signal and wherein the step of changing, at the remote device, the center frequency of the voltage controlled oscillator to match the carrier frequency of the FM signal comprises:
        i) applying the phase error signal to a low pass filter;
        ii) if the output of the low pass filter is greater than a predetermined nominal voltage, then charging a capacitor;
        iii) if the output of the low pass filter is less than a predetermined nominal voltage, then discharging a capacitor;
        iv) adjusting a center frequency select signal based on the charging or discharging state of the capacitor; and
        v) changing the center frequency of the voltage controlled oscillator to match the carrier frequency of the FM signal based on the center frequency select signal.

2. A method of communicating between a base and a remote device in a security system, said method comprising:
    a) the base receiving an audio signal from a telephone network via a panel
    b) the base frequency modulating the audio signal at a carrier frequency to generate an FM signal;
    c) the remote device receiving the FM signal from the base;
    d) at the remote device, determining a phase error signal representing the phase error between the received FM signal and an output signal of a voltage controlled oscillator;
    e) at the remote device, determining a difference between the carrier frequency and a center frequency of the voltage controlled oscillator;
    f) if there is a difference, then changing, at the remote device, the center frequency of the voltage controlled oscillator to match the carrier frequency of the FM signal;
    g) the remote receiving a second audio signal from a microphone;
    h) the remote frequency modulating the second audio signal at a carrier frequency to generate a second FM signal;
    i) the base receiving the second FM signal from the remote;
    j) at the base, determining a phase error signal representing the phase error between the received second FM signal and an output signal of a voltage controlled oscillator;
    k) at the base, determining a difference between the carrier frequency and a center frequency of the voltage controlled oscillator; and
    l) if there is a difference, then changing, at the base, the center frequency of the voltage controlled oscillator to match the carrier frequency of the second FM signal and wherein the step of changing, at the base, the center frequency of the voltage controlled oscillator to match the carrier frequency of the second FM signal comprises:
        i) applying the phase error signal to a low pass filter;
        ii) if the output of the low pass filter is greater than a predetermined nominal voltage, then charging a capacitor;
        iii) if the output of the low pass filter is less than a predetermined nominal voltage, then discharging a capacitor;
        iv) adjusting a center frequency select signal based on the charging or discharging state of the capacitor; and
        v) changing the center frequency of the voltage controlled oscillator to match the carrier frequency of the second FM signal based on the center frequency select signal.

3. A security system comprising:
a) a panel adapted to communicate over a telephone network;
b) a base interconnected to the panel to send and receive audio signals from the telephone network via the panel, the base comprising an FM modulator for frequency modulating an audio signal at a carrier frequency to generate an FM signal; and
c) a remote device in wireless communication with the base, the remote device comprising:
   i) a receiver for receiving the FM signal from the base;
   ii) a voltage controlled oscillator;
   iii) a phase lock loop circuit for determining a phase error signal representing the phase error between the received FM signal and an output signal of the voltage controlled oscillator;
   iv) a center frequency adjusting circuit for:
      determining a difference between the carrier frequency and a center frequency of the voltage controlled oscillator; and, if there is a difference;
      changing the center frequency of the voltage controlled oscillator to match the carrier frequency of the FM signal and wherein the center frequency adjusting circuit comprises a low pass filter to which the phase error signal is applied, the low pass filter comprising a capacitor that is charged if the output of the low pass filter is greater than a predetermined nominal voltage or discharged if the output of the low pass filter is less than a predetermined nominal voltage.

4. A security system comprising:
a) a panel adapted to communicate over a telephone network;
b) a base interconnected to the panel to send and receive audio signals from the telephone network via the panel, the base comprising an FM modulator for frequency modulating an audio signal at a carrier frequency to generate an FM signal; and
c) a remote device in wireless communication with the base, the remote device comprising:
   i) a receiver for receiving the FM signal from the base;
   ii) a voltage controlled oscillator;
   iii) a phase lock loop circuit for determining a phase error signal representing the phase error between the received FM signal and an output signal of the voltage controlled oscillator;
   iv) a center frequency adjusting circuit for:
      determining a difference between the carrier frequency and a center frequency of the voltage controlled oscillator; and, if there is a difference;
      changing the center frequency of the voltage controlled oscillator to match the carrier frequency of the FM signal and
further wherein
   the remote device further comprises an FM modulator for frequency modulating a second audio signal at a carrier frequency to generate a second FM signal; and
   the base further comprises:
      i) a receiver for receiving the second FM signal from the remote device;
      ii) a voltage controlled oscillator;
      iii) a phase lock loop circuit for determining a phase error signal representing the phase error between the received second FM signal and an output signal of the voltage controlled oscillator;
      iv) a center frequency adjusting circuit for:
         determining a difference between the carrier frequency and a center frequency of the voltage controlled oscillator; and, if there is a difference;
         changing the center frequency of the voltage controlled oscillator to match the carrier frequency of the second FM signal and wherein the center frequency adjusting circuit comprises a low pass filter to which the phase error signal is applied, the low pass filter comprising a capacitor that is charged if the output of the low pass filter is greater than a predetermined nominal voltage or discharged if the output of the low pass filter is less than a predetermined nominal voltage.

\* \* \* \* \*